May 10, 1949.  C. R. JONES  2,469,923
MIRROR SUPPORT HAVING SPACING FRAME
Filed Feb. 13, 1946  2 Sheets-Sheet 1

Inventor
Charles R. Jones
by Barthel & Bugbee
Atty's

May 10, 1949. C. R. JONES 2,469,923
MIRROR SUPPORT HAVING SPACING FRAME
Filed Feb. 13, 1946 2 Sheets-Sheet 2
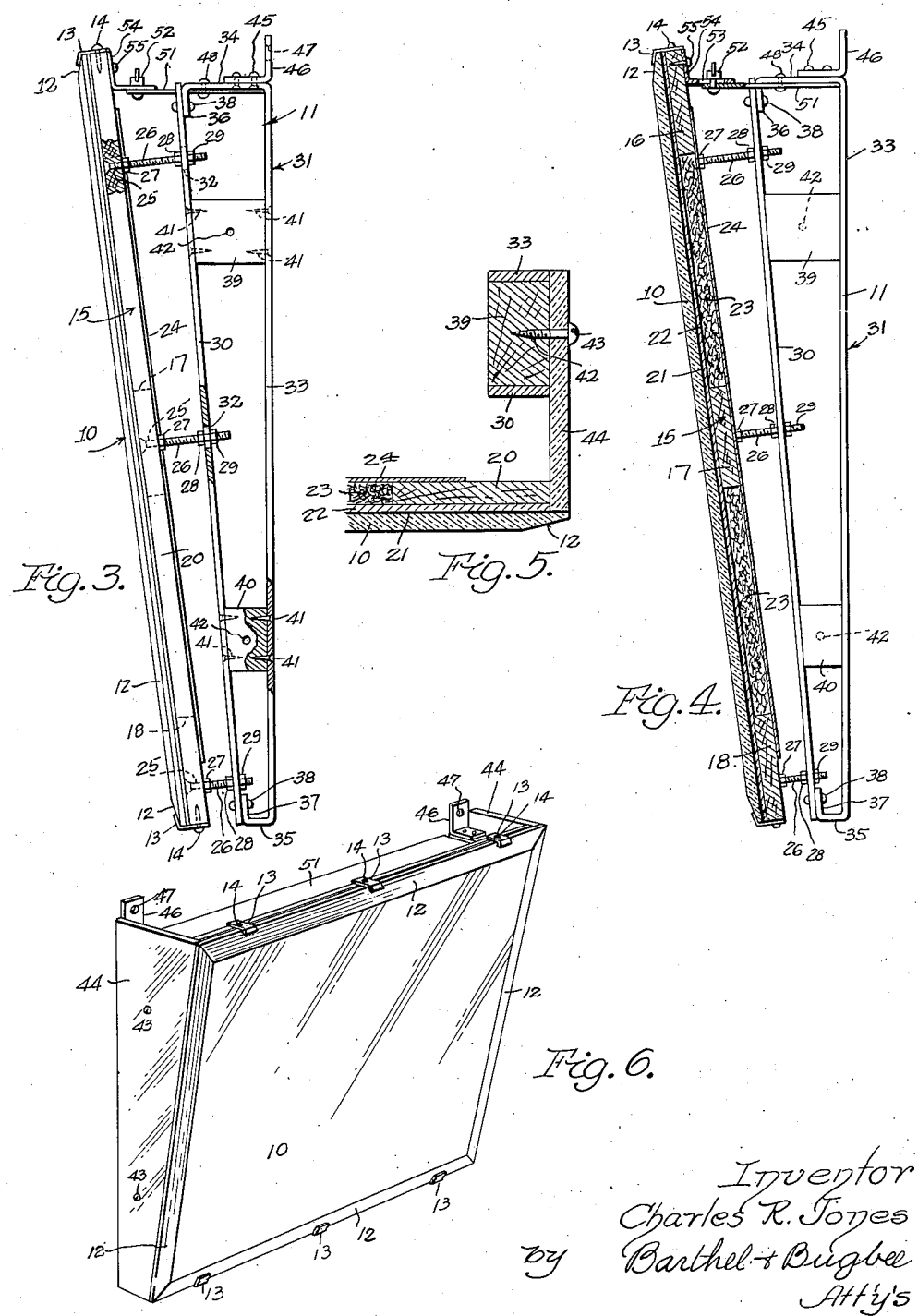
Inventor
Charles R. Jones
by Barthel & Bugbee
Att'y's Patented May 10, 1949

2,469,923

UNITED STATES PATENT OFFICE 2,469,923

MIRROR SUPPORT HAVING SPACING FRAME

Charles R. Jones, Berkley, Mich.

Application February 13, 1946, Serial No. 647,315

2 Claims. (Cl. 88—97)

1

This invention relates to supports, and in particular, to mirror supports and the like for holding mirrors upon vertical surfaces.

One object of this invention is to provide a mirror support which will hold a relatively large and heavy mirror without causing strain and consequent breakage to the mirror either during installation, or as a result of changes in the wall upon which it is hung.

Another object is to provide a mirror support which obviates the use of fasteners passing through the mirror, such means for suspending mirrors being a frequent source of breakage.

Another object is to provide a mirror support which will space the mirror away from the wall to which it is secured, thereby avoiding unequal expansion or contraction and consequent strain in the glass when the wall is heated, such as when the mirror is located above a fireplace.

Another object is to provide a mirror support wherein the mirror is insulated by a dead air space from the wall to which it is secured, thereby preventing damage to the silvering which otherwise frequently occurs when a mirror is secured directly to the wall above a fireplace, the heat from the chimney being transmitted through the walls and causing the silvering to deteriorate, this deterioration appearing as a vertical band of discoloration in the mirror.

Another object is to provide a mirror support consisting of a structure to which the mirror is attached and which is itself suspended from the wall, thereby eliminating uneven strains frequently arising in hanging large mirrors, particularly above fireplaces.

Another object is to provide an adjustable mirror support wherein provision is made in the mirror-carrying structure for adjustably tilting the mirror around a horizontal axis so that a person entering the room will see the remainder of the room reflected in the mirror with a minimum of the ceiling thus reflected.

Another object is to provide a mirror support consisting of a structure to which the mirror is attached and which is itself suspended from the wall, the side and top of the structure being enclosed, thereby preventing the deposit of dirt upon the back of the mirror, concealing the frame work of the structure and eliminating the need for a suspended wire.

Figure 3 is a side elevation, partly in section, of the mirror and mirror support shown in Figure 1 with the side plates removed so as to disclose the interior;

Figure 4 is a vertical section along the line 4—4 in Figure 1;

Figure 5 is a horizontal detailed section along the line 5—5 in Figure 1, showing the manner of attaching the side plates; and Figure 6 is a perspective view of the mirror and mirror support with the side plates attached.

Figure 1:
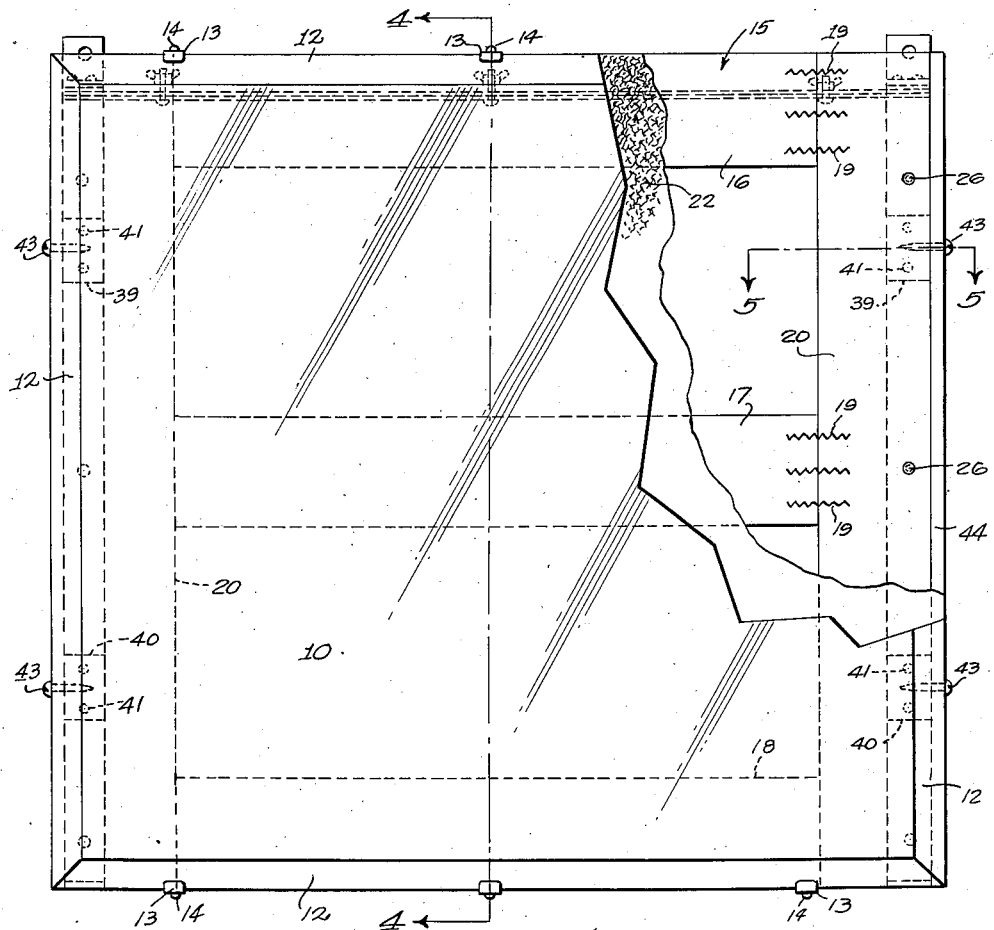
Figure 1 is a front elevation of a mirror and adjustable mirror support according to a preferred embodiment of the invention, partly broken away to disclose the substructure.

Referring to the drawings in detail, Figure 1 shows a mirror, generally designated 10, attached to a mirror support, generally designated 11 according to a preferred embodiment of the invention. The mirror 10 may be of any suitable type and is shown as having its edges bevelled as at 12. The mirror 10 is held by angle clips 13 secured by fasteners 14 to the frame 15 (Figure 1), which consists of horizontal members 16, 17 and 18 interconnected as at 19 by vertical end members 20. The frame 15 is preferably of plywood to minimize warping and to increase its strength.

The silvering layer 21 on the back of the mirror 10 (Figure 4) is insulated from the frame 15 by a felt cushioning layer 22. Behind the felt layer 22, the space between the frame members 16, 17, 18 and 20 is filled with heat insulating material such as felt 23 in order to further insulate the mirror silvering layer 21. A plate 24, such as cardboard or heavy paper, is glued or otherwise secured to the frame 15 behind the insulating layer 23 in order to retain the latter in position.

The frame end members 20 are provided with holes 25 at the top, middle and bottom thereof for receiving the countersunk supporting screws 26, the latter having lock nuts 27 securing them in place against the back of the frame end members 20. The screws 26 at their rearward ends are secured by nuts 28 and 29 to the inclined front member 30 of the side frames, generally designated 31, by which the structure is suspended from the wall, and pass through the slots 32 therein (Figure 3). The screws 26 and nuts 27, 28, 29 form adjustable attachment members by which the mirror frame 15 is secured to the side frames 31 (Figure 4).

Besides the front members 30, the side frames 31 include vertical rear members 33 having integral horizontal top and bottom extensions 34 and 35 respectively, with bent inclined end portions 36 and 37 secured as at 38 to the front members 30. Mounted between the front and rear side members 30 and 33 of the side frames 31 are upper and lower side panel attachment blocks 39 and 40 (Figures 3, 4 and 5), these being secured thereto by the fasteners 41. The blocks 39 and 40 may be of wood and have holes 42 therein for receiving the screws 43 by which the side panels 44 of mirror glass or other suitable material are attached to the side frames 31, thereby closing up the side areas between the back of the frame 15 and the rear side frame member 33 (Figures 5 and 6).

Figure 2:
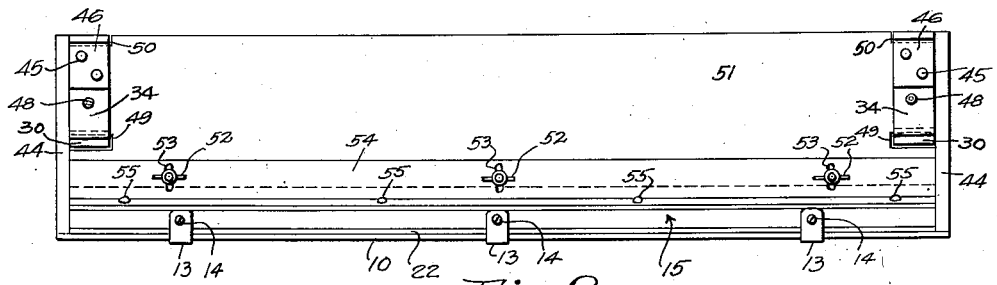
Figure 2 is a top plan view of the mirror and mirror support shown in Figure 1.

Secured as at 45 to the top extensions 34 of the side frames 31 are angle brackets 46, the vertical portions of which are provided with holes 47 (Figure 3) for the reception of fasteners (not shown) by which the mirror is attached to or suspended from a wall or other upright member. Likewise secured as at 48 to the extensions 34 and slotted as at 49 and notched as at 50 to pass between the forward and rearward members 30 and 33 of the frame 31, is a top plate 51 (Figure 2). The forward portion of the top plate 51 is drilled to receive wing bolts 52 which pass through slots 53 in an elongated angle member 54, the upper portion of which is inclined and secured as by the fasteners 55 to the upper portion of the frame 15. The space behind the mirror 10, while closed at the top and sides by the members 51 and 44, is left open at the bottom in order to permit fresh air to reach this space so as to prevent deterioration of the silvering layer 21.

In mounting a mirror, such as to a vertical wall above a fireplace, the mirror 10 is preferably first attached to the frame 15 by means of the clips 13 and fasteners 14, after the cushioning layer 22 and insulating layer 23 have been installed and the back closed by the plate 24. The side panels 44 are meanwhile left off while the mirror and its frame structure 11 are attached to the wall by expansion bolts or other fasteners (not shown) inserted through the holes 47 in the angle brackets 46.

With the mirror 10 thus mounted, as above a fireplace, its inclination can then be adjusted to the proper angle by loosening the wing bolts 52 and shortening or lengthening the distance between the frame 15 and the forward members 30 of the frames 31. This is done by adjusting the nuts 28 and 29 along the screws 26, the slots 32 allowing for any variations in position of the screws 26. When the desired tilt has been obtained, such as when all portions of the room can be seen by a person at the far end thereof from the mirror and the ceiling is eliminated or minimized, as seen in the mirror, the wing bolts 52 are tightened and likewise the nuts 28 and 29 on the screws 26, thereby locking the mirror 10 in its adjusted position. The side panels 44 are then cut to proper size and shape to fit their allotted spaces and secured in position by the screws 43 passing into the holes 42 in the blocks 39 and 40. When the tilt of the mirror has been once adjusted in this manner to fit the particular room, no further adjustment is thereafter needed, hence one set of side panels 44 will ordinarily suffice for all time. However, in the rare instance when the mirror is moved to a different house or different room and is then adjusted to a different tilt than before, a new set of side panels 44 of different size and shape is prepared and installed in the same manner, or, when feasible, the old side panels 44 are recut to the new shape required by the different tilt of the mirror.

While I have shown and described my invention in detail, it is to be understood that the same is to be limited only by the appended claims, for many changes may be made without departing from the spirit and scope of my invention.

What I claim is:

1. A mirror support comprising a mirror frame, having frame members extending around the periphery of the mirror behind the edge thereof and forming a recess at the back of the mirror, a supporting frame structure spacing said mirror frame away from the wall and having inclined forward and vertical rear portions adjacent the mirror frame and wall respectively extending substantially the full height of the mirror, said frame structure having fastener receiving portions thereon for attachment to said wall, attachment members extending between the forward portion of said structure and the mirror frame for securing the mirror frame thereto, and a relatively thick layer of heat insulating material disposed behind said mirror in said recess formed by said mirror frame and the mirror and extending over the major portion of the rear surface of said mirror.

2. A mirror support comprising a mirror frame, means for securing the mirror to said mirror frame, a plurality of side frame structures having vertical rear portions and inclined forward portions extending substantially the full height of said mirror, adjustable attachment members extending between said mirror frame and said forward portions, and fastener-receiving portions on said side frame structures for securing the same to a wall, said attachment members comprising threaded fasteners having threaded adjusting and locking elements threaded thereon, said attachment members being spaced over substantially the full height of the mirror.

CHARLES R. JONES.

REFERENCES CITED

The following references are of record in the file of this patent:

UNITED STATES PATENTS

| Number | Name | Date |
|---|---|---|
| 325,419 | Langdon | Sept. 1, 1885 |
| 675,154 | Heep | May 28, 1901 |
| 697,438 | Braymes | Apr. 15, 1902 |
| 881,661 | Burnard | May 10, 1908 |
| 1,184,304 | Bellemare et al. | May 23, 1916 |
| 1,654,751 | Oishei | Jan. 3, 1928 |
| 1,919,475 | McKinley | July 25, 1933 |
| 2,003,171 | Burrell | May 28, 1935 |
| 2,325,615 | La Hodny et al. | Aug. 3, 1943 |